No. 746,033. PATENTED DEC. 8, 1903.
Q. CRANE.
WAFFLE IRON.
APPLICATION FILED DEC. 2, 1902.
NO MODEL. 2 SHEETS—SHEET 1.
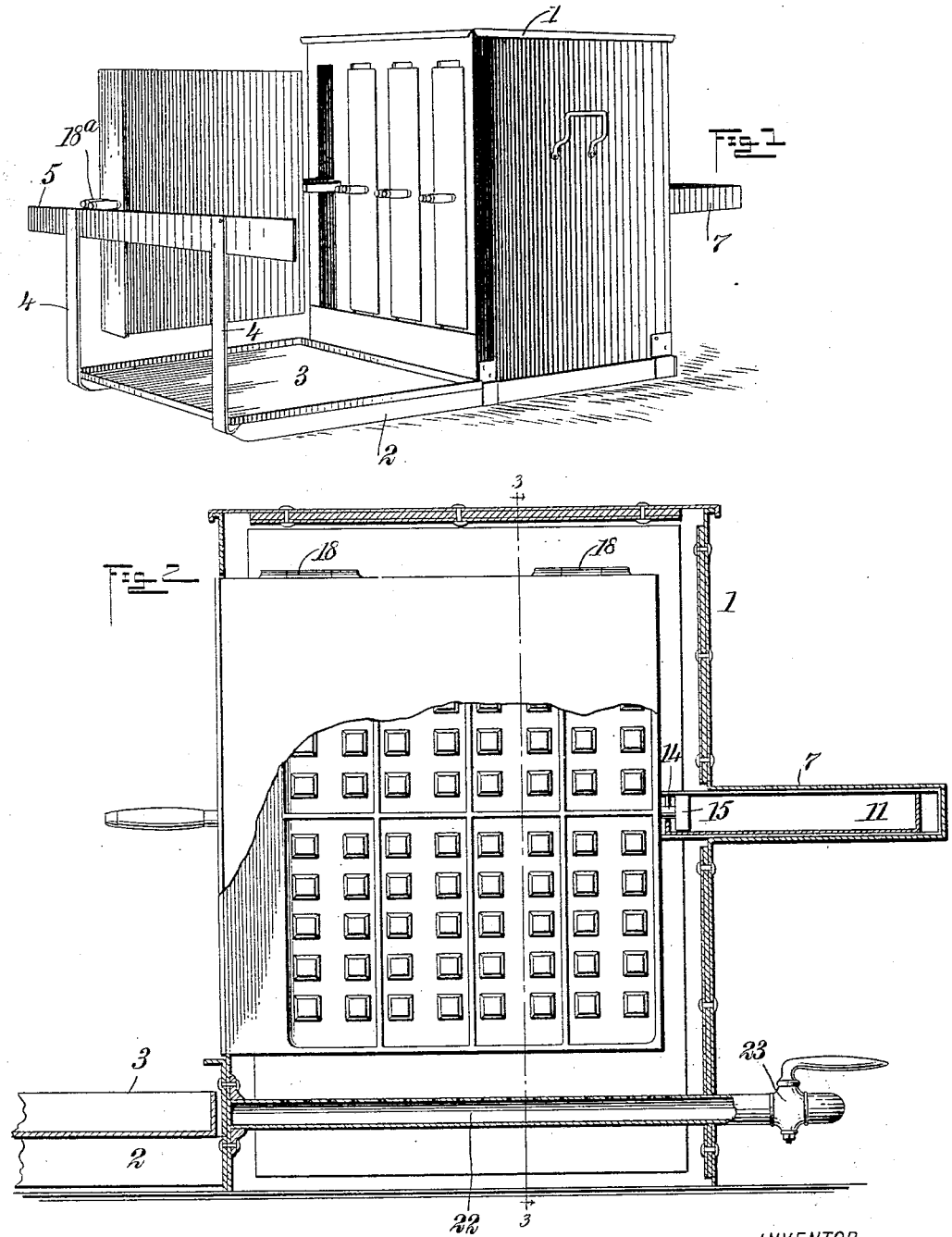
WITNESSES:
INVENTOR
Quince Crane
BY
ATTORNEYS.

No. 746,033. PATENTED DEC. 8, 1903.
Q. CRANE.
WAFFLE IRON.
APPLICATION FILED DEC. 2, 1902.
NO MODEL. 2 SHEETS—SHEET 2.
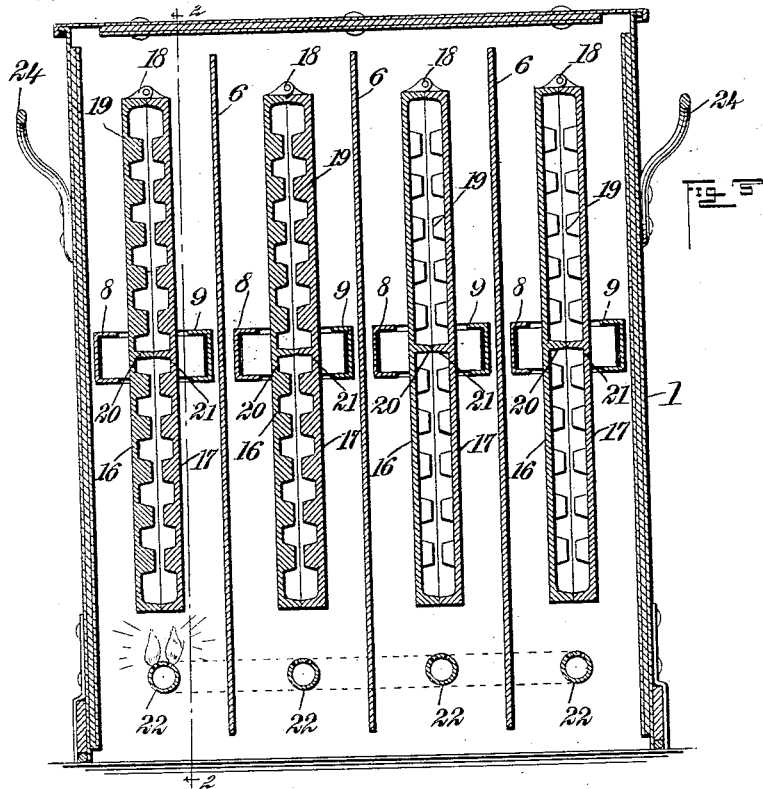
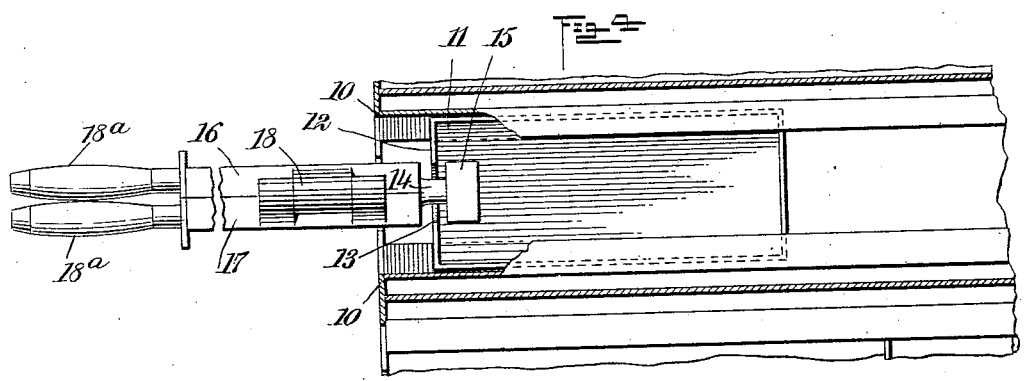
WITNESSES:
INVENTOR
Quince Crane
BY
ATTORNEYS.

No. 746,033.

Patented December 8, 1903.

UNITED STATES PATENT OFFICE.

QUINCE CRANE, OF SAN DIEGO, CALIFORNIA.

WAFFLE-IRON.

SPECIFICATION forming part of Letters Patent No. 746,033, dated December 8, 1903.

Application filed December 2, 1902. Serial No. 133,542. (No model.)

*To all whom it may concern:*

Be it known that I, QUINCE CRANE, a citizen of the United States, and a resident of San Diego, in the county of San Diego and State of California, have invented new and useful Improvements in Waffle-Irons, of which the following is a full, clear, and exact description.

This invention relates to certain novel and useful improvements in baking-ovens and attachments therefor, and has particular application to a cooking or baking utensil of the type commonly known as a "waffle-iron."

In carrying out the present invention one of the main objects is to provide a baking iron or utensil of the character described which will effect a great saving of fuel and labor and one which will occupy but comparatively little space, while at the same time it will embody the essential and desirable features of cleanliness, convenience, and simplicity.

A further object of this invention is to form a waffle-iron of two portions or members, which will be hinged together at one of their edges, each of said members being provided with suitable handles, this construction greatly expediting the operation of baking. I have also in view the provision of various novel means to be hereinafter set forth, whereby the waffle-iron and its contents may be readily inserted in and withdrawn from the oven.

To the accomplishment of the hereinbefore-recited ends and others of a similar nature the present invention consists in the construction, combination, and arrangement of parts, which will be hereinafter described in this specification, illustrated in the drawings, and set forth in the appended claims.

Reference is to be had to the accompanying drawings, forming a part of this specification, in which similar characters of reference indicate corresponding parts in all the figures.

Figure 1 is a perspective view of an oven provided with my improvement, one of the waffle-irons being shown as withdrawn from said oven. Fig. 2 is a vertical sectional view taken longitudinally of said oven on the line 2 2 in Fig. 3, showing one of my improved waffle-irons therein, one of the hinged members of said iron being broken away to illustrate the interior construction thereof. Fig. 3 is a transverse vertical sectional view taken on the line 3 3 of Fig. 2; and Fig. 4 is a top view, partly in section, showing the construction of the slides and guideways for the waffle-iron.

In the accompanying drawings, wherein an embodiment of my improvement is delineated, 1 designates the casing or structure of the oven, which may be of any preferred form or shape, preferably cubical, as shown in the present instance, and secured to the base portion of said oven and extending for some distance in front thereof is the frame 2, adapted to support a suitable drip-pan or other receptacle 3 for catching the grease, drippings, or the like. The frame 2 has the upwardly-extending standards 4 4 preferably formed integral therewith, a strip or bar 5 connecting the upper ends of the aforesaid standards 4 4, this bar 5 forming a rest or support for the waffle-irons proper when the latter are withdrawn from the oven.

The interior of the oven or casing is divided by a number of vertically-arranged walls or partitions 6, the number of such partitions depending upon the size and capacity of the oven, and these walls 6 are of such length that when mounted in position in the aforesaid oven a slight space is left between the bottom of the oven and the upper and lower edges of the partitions.

The back of the oven is provided with a series of hollow extensions or sleeves 7, one sleeve being provided for each space or chamber formed by the partitions, and these extensions or sleeves 7 are adapted to receive and support the rear ends of the horizontally-disposed guideways 8 and 9, which guideways extend along through the oven and are secured to the inner surface of the front walls of the aforesaid oven by riveting or otherwise, as at 10. It will further be observed that there are two of these guideways for each chamber or space formed by the partitions, and each pair of guideways is adapted to support and permit to move longitudinally thereof the pan or slide 11, as clearly shown in Fig. 4. This pan or slide has its wall 12 cut away, as at 13, to receive and seat the shank 14 of the bolt or stud formed on one of the members of the waffle-iron, the head of such stud, as at 15, extending into said slide.

The waffle-iron mentioned above, as heretofore stated, is composed of two members or portions 16 and 17, each member having a handle 18ª at its front face and connected at their upper edges by hinges 18. The inner faces of these arms are provided with the usual lugs or projections 19, and centrally arranged transversely of the members are the walls or partitions 20 and 21, the edges of such partitions being adapted to contact when the iron is closed, whereby two waffles or cakes may be baked in one iron, as these partitions divide said iron into two sections or pans.

The batter held in the iron may be baked over any suitable stove, such as gas or gasolene, or the oven may be provided with the heating device shown herein, which in the present instance consists of horizontally-arranged perforated burners or pipes 22, one of said pipes being provided for each iron and connected with any suitable source of gas or gasolene supply, such pipes being also provided with the usual valve or stop-cock 23.

For the purpose of moving the oven from place to place I have provided suitable handles 24, which are secured to the sides of the casing.

From the above description, taken in connection with the drawings, the operation and method of using my improvement will be apparent. The iron being withdrawn from the casing and occupying the position shown in Fig. 1, the handles being supported by the cross-bar 5, said iron is turned until the sections or pans occupy a horizontal position, this movement being permitted by the stud at the back of one of the sections turning in the cut-away portion of the slide 11. When the sections are closed, the iron is swung to its vertical position upon the pivot and slid into the heating-chamber upon the guideways, as hereinbefore explained. As the slide 11 is forced rearward on the guideways it enters or is directed into the extensions 7 such a distance that the iron will be supported directly over the burner. As soon as the batter in the iron is thoroughly baked it may be removed and the pan again filled and the operation of baking continued.

Having thus described my invention, I claim as new and desire to secure by Letters Patent—

1. A device of the class described, comprising an oven, guideways formed therein, a sliding pan movable on said guideways and having one wall thereof formed with a cut-away portion, and a baking-iron adapted to be partially supported in the cut-away portion of the sliding pan, substantially as set forth.

2. A device of the class described, comprising an oven, having a hollow extension formed at the rear thereof and communicating therewith, guideways formed in said oven and extended back into said aforesaid rear extension, a slide mounted on said guideway and adapted to move along the same into the rear housing or extension, and a baking-iron supported at one end by, and adapted to move with, said slide, substantially as set forth.

3. A device of the class described, comprising an oven, partitions or walls dividing said oven into a series of chambers, a pan sliding in said oven, one of the walls of said pan having a cut-away portion, and a two-part baking-iron adapted to rest in the cut-away portion of the pan and be partially supported thereby, substantially as set forth.

4. A device of the class described, comprising an oven, an extension formed at the base portion of said oven, a receptacle carried by said extension, a supporting-frame mounted on the extension, and a baking-iron slidably mounted in guideways in the oven, said iron being supported at one end by the aforesaid frame and at its opposite end on the guideways when the iron is withdrawn from the oven, substantially as set forth.

5. A device of the class described, comprising an oven divided into a series of chambers, guideways for each of said chambers, a two-part baking-iron, and means independent of said baking-iron slidable along said guideways in the oven and adapted to assist in supporting said baking-iron, substantially as set forth.

6. A device of the class described, comprising an oven, guideways formed therein, a slide movable along said guideways, and a baking-iron movably supported at one end on said slide, substantially as set forth.

7. A device of the class described, comprising an oven, guideways formed in said oven, a slide movable on said guideways, the front end of said slide being cut away, a two-part hinged baking-iron provided with a stud, said stud resting in the cut-away portion of the slide, and handles for said iron, the construction being such that the baking-iron is adapted to slide into the oven, and when removed therefrom may be rotated on said slide through the medium of the stud seated in the cut-away portion of said slide, substantially as set forth.

In testimony whereof I have signed my name to this specification in the presence of two subscribing witnesses.

QUINCE CRANE.

Witnesses:
HATTIE E. CRANE,
BELLE SUMNER ANGIER.